F. X. MÜLLER.
HOSE COUPLING.
APPLICATION FILED AUG. 18, 1914.
1,160,944.
Patented Nov. 16, 1915.
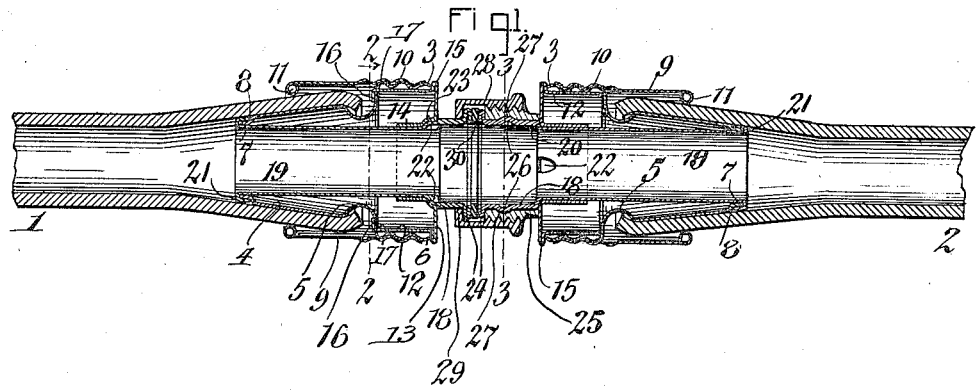
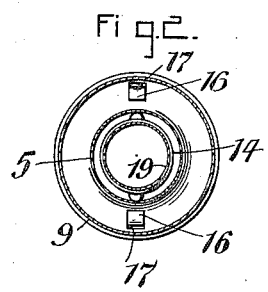 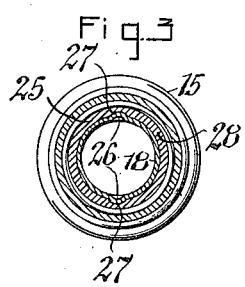 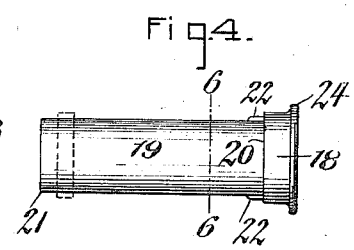
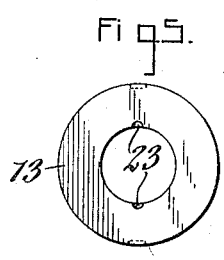 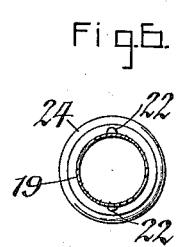 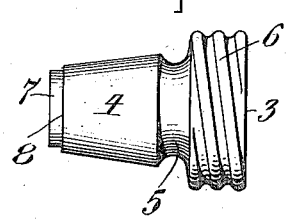
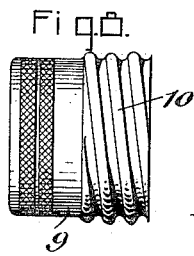
WITNESSES.
Julius J. Prible
W. Ray Taylor
INVENTOR
Frank X. Müller
by Geyer & Popp
ATTORNEYS.

UNITED STATES PATENT OFFICE.

FRANK X. MÜLLER, OF BUFFALO, NEW YORK, ASSIGNOR TO REPUBLIC HOSE COUPLER CORPORATION, OF BUFFALO, NEW YORK, A CORPORATION OF NEW YORK.

HOSE-COUPLING.

1,160,944.  Specification of Letters Patent.  Patented Nov. 16, 1915.

Application filed August 18, 1914. Serial No. 857,329.

*To all whom it may concern:*

Be it known that I, FRANK X. MÜLLER, a citizen of the United States, residing at Buffalo, in the county of Erie and State of New York, have invented new and useful Improvements in Hose-Couplings, of which the following is a specification.

This invention relates to a hose coupler and has for its object to provide a coupler for this purpose which can be produced at comparatively low cost and which is simple and durable in construction, efficient in operation and capable of being easily manipulated for coupling or uncoupling two sections of a hose.

In the accompanying drawings: Figure 1 is a longitudinal section of a hose coupler embodying my improvement and showing the same applied to two sections of a hose for connecting the same. Figs. 2 and 3 are vertical transverse sections taken in the correspondingly numbered lines in Fig. 1. Fig. 4 is a side elevation of the conducting tube of one of the coupler sections showing its condition before being assembled with the remaining parts of the respective section. Fig. 5 is a front end view of the ferrule forming part of one of the coupler sections. Fig. 6 is a vertical transverse section taken in line 6—6, Fig. 4. Fig. 7 is a side elevation of the ferrule of one of the coupler sections, showing its condition before being assembled with the companion members of the respective sections. Fig. 8 is a side elevation of the clamping sleeve of one of the coupler sections.

Similar characters of reference indicate corresponding parts throughout the several views.

In its general organization, this hose coupler comprises two sections which are identical in construction and which are adapted to be connected respectively with two sections 1, 2, of a hose and they are also adapted to be connected detachably with each other by a screw threaded union joint.

Each of the coupler sections comprises a ferrule, a clamping sleeve, a head and a conducting tube. Each of the ferrules is of substantially tubular form and preferably comprises an enlarged front part or body 3, a reduced rearwardly-tapering or conical rear part or shank 4, and a contracted neck 5 connecting the rear end of the body with the front end of the shank. This body, shank and neck of the ferrule are preferably constructed of one piece of sheet metal and the body-portion of the ferrule has its periphery constructed to form an external or male screw thread 6. The rear end 7 of the shank is contracted so as to form a rearwardly-facing shoulder 8 on the exterior of the shank. The conical or tapering shank of each ferrule is inserted into the end of one of the hose sections, which latter being usually of a flexible character, is distended somewhat. The clamping sleeve 9 of this coupler section is adapted to secure the end of the hose section on the respective conical or tapering shank and is provided on its front part with an internal or female screw thread 10 which engages with the external thread of the ferrule, while its rear end is provided with an inwardly-projecting bead or annular flange 11 which is adapted to engage with that part of the respective hose section surrounding the companion conical shank. By screwing the clamping sleeve tightly on the body of the ferrule after the hose end has been slipped over the companion shank, the bead or flange of the clamping sleeve is pressed against the outer side of the hose section and causes the latter to be firmly gripped between the bead 11 of the clamping sleeve and the shank of the ferrule, so that these parts are firmly united and prevented from becoming detached while the hose is in use. The clamping sleeve together with its screw thread and clamping bead are preferably made of sheet metal and out of one piece.

The head of each coupler section comprises a body 12 preferably of cylindrical form, a transverse web or disk 13 arranged at the front end of the body and a rearwardly-projecting centering collar, tube or sleeve 14 arranged on the central part of the disk. The body of the head is placed within the body of the ferrule so as to engage the inner side of the screw thread of the latter. At the outer front corner of the head between the body and disk thereof the same is provided with an outwardly-projecting annular bead 15 which engages with the front end of the ferrule. At its rear end the body of the head is provided with two lips 16 which pass through corresponding openings 17 formed in the neck of the ferrule and are bent transversely inward relatively to the axis of the coupler section and into engagement with the rear side of the neck, thereby connecting the ferrule and head. The body, disk, bead, centering collar and fastening lips of the head are all formed in one piece from a single sheet of metal.

The conducting tube comprises a tubular front part 18 of comparatively large diameter and a tubular rear part 19 of somewhat smaller diameter, forming a rearwardly facing shoulder 20 between the front and rear parts of this tube. The rear part of the conducting tube is passed rearwardly through the centering collar of the head and the contracted rear end of the companion shank until the shoulder between the front and rear parts of this conducting tube engage with the front side of the disk 14 of the respective coupler section, after which the rear end 21 of the conducting tube is folded outwardly and forwardly around the contracted rear end of the companion shank, so as to form a seam between the same, as shown in Fig. 1, thereby securely uniting the conducting tube and ferrule and assisting in confining the head between the conducting tube and the ferrule. Rotation of the conducting tube in the head may be prevented in various ways, for instance, by means of two laterally projecting keys 22 which are pressed outwardly from the conducting tube adjacent to the shoulder between the front and rear parts thereof and engaging with corresponding seats 23 on the companion head at the inner corner between the disk and the centering collar thereof.

At its front end the conducting tube is provided with a laterally projecting annular flange 24 which is preferably constructed in the form of a bead by reversely bending or doubling the outer end portion of the conducting tube upon itself. All of the parts of the conducting tube just described are also preferably constructed from a single sheet of metal.

Two coupler sections constructed in this manner and applied to the opposing ends of two hose-sections may be detachably connected with each other in various ways but preferably by the means which are shown in the drawings and which comprise a male coupling sleeve 25 mounted on the enlarged front part of one of the conducting tubes and engaging its front and rear ends with the flange of the conducting tube and the disk of the companion head and provided on its periphery with an external or male screw thread. This male coupling sleeve may be held against turning on the respective conducting tube solely by friction but the same is preferably additionally held against turning on its conducting tube by means of keys 26 formed on the enlarged front part of the respective conducting tube by bending portions of the metal thereof outwardly into engagement with corresponding seats 27 formed in the bore of the male coupling sleeve, as shown in Figs. 1 and 2. The external thread of the male coupling sleeve is engaged by the internal screw threads formed on the front end of the tubular body of a female coupling sleeve 28 which latter is provided at its rear end with an inwardly-projecting annular flange 29 which is mounted loosely upon the periphery of the enlarged front part of the other conducting tube of the hose coupler between the front flange thereof and the disk of the companion head, as shown in Fig. 1. In order to produce a tight joint between the opposing ends of the two conducting tubes, a packing ring or washer 30 of rubber or any other suitable material is inserted between these flanges, so that upon tightening the coupling sleeves 25, 28, the flanges of the conducting tubes will be drawn firmly against opposite sides of the packing ring or washer and effectually prevent leakage. The male bushing and the female coupling sleeve practically form a union whereby the two sections of the hose coupler may be readily connected or disconnected. These members of the union are also preferably constructed of sheet metal in any suitable and well known manner. When two sections of hose are connected in this manner by my improved coupler, a practically free and smooth passage is formed through the coupler which places the hose sections in communication with each other.

Inasmuch as all of the parts of this hose coupler are made of sheet metal the same can be made very light, durable, compact and at comparatively low cost, thereby rendering the same particularly suitable for connecting the sections of garden hose, although the same may also be used for other kinds of hose or tubes.

Furthermore, this coupler has no laterally projecting parts which are liable to catch on the ground or interfere with obstructions when drawn over the ground, and this also permits of handling the hose freely without liability of injuring the hands and also permits of compactly reeling the hose on a rack without liability of the coupling injuring the hose.

I claim as my invention:

1. A hose coupler comprising a ferrule having an enlarged front body provided with an external screw thread, a reduced conical rear shank adapted to engage the inner side of a section of hose, a contracted neck connecting said body and shank, a clamping sleeve provided on its front end with an internal screw thread engaging with said external thread and at its rear end with an internal clamping flange which is adapted to engage with the outer side of said hose section, and a conducting tube arranged in said ferrule and secured to the same at its rear end.

2. A hose coupler comprising a ferrule having an enlarged front body provided with an external screw thread, a reduced conical rear shank adapted to engage the inner side of a section of hose, and a contracted neck connecting said body and shank, a clamping sleeve provided on its front end with an internal screw thread engaging with said external thread and at its rear end with an internal clamping flange which is adapted to engage with the outer side of said hose section, and a conducting tube arranged in said ferrule and provided at its rear end with a reversely bent flange which engages with the contracted rear end of said shank.

3. A hose coupler comprising a ferrule having an enlarged front body provided with an external screw thread, a reduced conical rear shank adapted to engage the inner side of a section of hose, and a contracted neck connecting said body and shank, a clamping sleeve provided on its front end with an internal screw thread engaging with said external thread and at its rear end with an internal clamping flange which is adapted to engage with the outer side of said hose section, a conducting tube arranged in said ferrule, and a head arranged between the front parts of said ferrule and conducting tube.

4. A hose coupler comprising a ferrule having an enlarged front body provided with an external screw thread, a reduced conical rear shank adapted to engage the inner side of a section of hose, and a contracted neck connecting said body and shank, a clamping sleeve provided on its front end with an internal screw thread engaging with said external thread and at its rear end with an internal clamping flange which is adapted to engage with the outer side of said hose section, a conducting tube arranged in said ferrule, and a head having a tubular body arranged in the body of the ferrule, a centering sleeve surrounding said conducting tube, and a disk connecting the front ends of the body and sleeve of said head.

5. A hose coupler comprising a ferrule having an enlarged front body portion provided with an external screw thread, a reduced conical rear shank adapted to engage the inner side of a section of hose, and a contracted neck connecting said body and shank, a clamping sleeve provided on its front end with an internal screw thread engaging with said external thread and at its rear end with an internal clamping flange which is adapted to engage with the outer side of said hose section, a conducting tube arranged in said ferrule, and a head having a tubular body arranged in the body of the ferrule, a centering sleeve surrounding said conducting tube, and a disk connecting the front ends of the body and sleeve of said head, the body of the head being provided at its rear end with lips which pass rearwardly through openings in said neck and engage with the rear side of the latter.

6. A hose coupler comprising a ferrule having an enlarged front body portion provided with an external screw thread, a reduced conical rear shank adapted to engage the inner side of a section of hose, and a contracted neck connecting said body and shank, a clamping sleeve provided on its front end with an internal screw thread engaging with said external thread and at its rear end with an internal clamping flange which is adapted to engage with the outer side of said hose section, a conducting tube arranged in said ferrule, a head having a tubular body arranged in the body of the ferrule, a centering sleeve surrounding said conducting tube, and a disk connecting the front ends of the body and sleeve of said head, the body of the head being provided at its front end with a laterally projecting flange which engages with the front end of said ferrule.

7. A hose coupler comprising a ferrule having an enlarged front body portion provided with an external screw thread, a reduced conical rear shank adapted to engage the inner side of a section of hose, and a contracted neck connecting said body and shank, a clamping sleeve provided on its front end with an internal screw thread engaging with said external thread and at its rear end with an internal clamping flange which is adapted to engage with the outer side of said hose section, a conducting tube arranged in said ferrule, a head having a tubular body arranged in the body of the ferrule, a centering sleeve surrounding said conducting tube, and a disk connecting the front ends of the body and sleeve of said head, said conducting tube being provided with a rearwardly facing shoulder which engages with the front side of said disk.

8. A hose coupler comprising a ferrule having an enlarged front body portion provided with an external screw thread, a reduced conical rear shank adapted to engage the inner side of a section of hose, and a contracted neck connecting said body and shank, a clamping sleeve provided on its front end with an internal screw thread engaging with said external thread and at its rear end with an internal clamping flange which is adapted to engage with the outer side of said hose section, a conducting tube arranged in said ferrule, a head having a tubular body arranged in the body of the ferrule, a centering sleeve surrounding said conducting tube, and a disk connecting the front ends of the body and sleeve of said head, said conducting tube being provided with a laterally projecting key which engages with a corresponding seat in said head.

9. A hose coupler comprising a ferrule having an enlarged front body portion provided with an external screw thread, a reduced conical rear shank adapted to engage the inner side of a section of hose, and a contracted neck connecting said body and shank, a clamping sleeve provided on its front end with an internal screw thread engaging with said external thread and at its rear end with an internal clamping flange which is adapted to engage with the outer side of said hose section, a conducting tube arranged in said ferrule, a head having a tubular body arranged in the body of the ferrule, a centering sleeve surrounding said conducting tube, and a disk connecting the front ends of the body and sleeve of said head, said conducting tube being provided at its front end with a laterally projecting flange.

10. A hose coupler comprising a ferrule having an enlarged front body portion provided with an external screw thread, a reduced conical rear shank adapted to engage the inner side of a section of hose, and a contracted neck connecting said body and shank, a clamping sleeve provided on its front end with an internal screw thread engaging with said external thread and at its rear end with an internal clamping flange which is adapted to engage with the outer side of said hose section, a conducting tube arranged in said ferrule, a head having a tubular body arranged in the body of the ferrule, a centering sleeve surrounding said conducting tube, and a disk connecting the front ends of the body and sleeve of said head, said conducting tube being provided at its front end with a laterally projecting flange and said conducting tube being provided with a coupling sleeve between the flange thereof and said disk.

Witness my hand this 17th day of August, 1914.

FRANK X. MÜLLER.

Witnesses:
 GEO. J. WINTER,
 THEO. L. POPP.